US012418759B2

(12) United States Patent
Richner et al.

(10) Patent No.: US 12,418,759 B2
(45) Date of Patent: Sep. 16, 2025

(54) HEARING DEVICE HAVING A SHELL THAT INCLUDES A COMPRESSIBLE REGION AND METHODS OF MANUFACTURING THE SAME

(71) Applicant: SONOVA AG, Staefa (CH)

(72) Inventors: Patrizia Richner, Männedorf (CH); Thomas Wessel, Männedorf (CH)

(73) Assignee: Sonova AG, Staefa (CH)

( * ) Notice: Subject to any disclaimer, the term of this patent is extended or adjusted under 35 U.S.C. 154(b) by 169 days.

(21) Appl. No.: 18/123,691

(22) Filed: Mar. 20, 2023

(65) Prior Publication Data
US 2024/0323624 A1   Sep. 26, 2024

(51) Int. Cl.
G06T 17/00   (2006.01)
H04R 25/00   (2006.01)

(52) U.S. Cl.
CPC ........... *H04R 25/652* (2013.01); *G06T 17/00* (2013.01); *H04R 25/658* (2013.01); *H04R 2225/025* (2013.01); *H04R 2225/77* (2013.01)

(58) Field of Classification Search
CPC ............... H04R 25/652; H04R 25/658; H04R 2225/025; H04R 2225/77; G06T 17/00
USPC ................................ 381/312, 322, 324, 328
See application file for complete search history.

(56) References Cited

U.S. PATENT DOCUMENTS

| | | | |
|---|---|---|---|
| 4,834,211 A | 5/1989 | Bibby et al. | |
| 4,913,165 A | 4/1990 | Fishgoyt | |
| 6,513,621 B1 | 2/2003 | Deslauriers et al. | |
| 6,533,062 B1 | 3/2003 | Widmer et al. | |
| 9,774,962 B2 | 9/2017 | Karamuk et al. | |
| 10,904,682 B2 | 1/2021 | Breitenfeld et al. | |
| 11,457,323 B2 | 9/2022 | Schreiner et al. | |
| 2002/0196958 A1 | 12/2002 | Halteren et al. | |
| 2007/0183613 A1 | 8/2007 | Juneau et al. | |
| 2008/0264428 A1 | 10/2008 | Purcell et al. | |
| 2009/0022353 A1 | 1/2009 | Goldstein et al. | |
| 2009/0214072 A1 | 8/2009 | Staab et al. | |
| 2010/0012420 A1 | 1/2010 | Keady | |
| 2011/0085689 A1 | 4/2011 | Keady | |

(Continued)

FOREIGN PATENT DOCUMENTS

DE   102009031684 A1   1/2011
DE   102019206744 B3   9/2020

(Continued)

OTHER PUBLICATIONS

German Search Report received May 19, 2025 in German Application No. DE102024102515.8.

Primary Examiner — George C Monikang
(74) Attorney, Agent, or Firm — ALG Intellectual Property, LLC

(57) ABSTRACT

An exemplary hearing device may comprise an in-the-ear ("ITE") component comprising a shell that is custom formed of a soft material by additive manufacturing to fit at least partially within an ear canal of the user. The shell may include a compressible region provided along an outer surface of the shell that is configured to contact a wall of the ear canal. The compressible region may be deformable due to a cavity that is located within the shell in the compressible region and that is configured to deform and/or compress when the ear canal deforms while the ITE component is inserted within the ear canal of the user.

21 Claims, 13 Drawing Sheets

(56) References Cited

U.S. PATENT DOCUMENTS

| | | | |
|---|---|---|---|
| 2013/0056295 A1* | 3/2013 | Campbell | H04R 25/652 |
| | | | 181/135 |
| 2013/0092470 A1 | 4/2013 | Johnston et al. | |
| 2016/0150331 A1 | 5/2016 | Wenzel | |
| 2017/0026732 A1 | 1/2017 | Kirsch et al. | |
| 2017/0281416 A1 | 10/2017 | O'Leary et al. | |
| 2017/0303027 A1 | 10/2017 | Barry | |
| 2017/0305040 A1 | 10/2017 | Schreiner et al. | |
| 2018/0332379 A1 | 11/2018 | McGarry et al. | |
| 2019/0278556 A1 | 9/2019 | Usher et al. | |
| 2020/0198829 A1* | 6/2020 | Rizzo | B29C 49/071 |
| 2021/0152911 A1 | 5/2021 | Mizoe | |
| 2021/0152924 A1 | 5/2021 | Keady | |

FOREIGN PATENT DOCUMENTS

| | | |
|---|---|---|
| EP | 0755169 A1 | 1/1997 |
| EP | 1060639 B1 | 3/2006 |
| EP | 3863298 A1 | 8/2021 |
| WO | 2008075221 A1 | 6/2008 |
| WO | 2009014505 A1 | 1/2009 |
| WO | 2009015210 A2 | 1/2009 |
| WO | 2009077902 A2 | 6/2009 |
| WO | 2010001305 A2 | 1/2010 |
| WO | 2010001307 A2 | 1/2010 |
| WO | 2010094033 A2 | 8/2010 |
| WO | 2011041900 A1 | 4/2011 |
| WO | 2011079383 A1 | 7/2011 |
| WO | 2012007193 A1 | 1/2012 |
| WO | 2015179975 A1 | 12/2015 |
| WO | 2016064364 A1 | 4/2016 |
| WO | 2016069866 A2 | 5/2016 |
| WO | 2017186773 A1 | 11/2017 |
| WO | 2019135184 A1 | 7/2019 |
| WO | 2019173809 A1 | 9/2019 |

* cited by examiner

HEARING DEVICE HAVING A SHELL THAT INCLUDES A COMPRESSIBLE REGION AND METHODS OF MANUFACTURING THE SAME

BACKGROUND INFORMATION

Hearing devices (e.g., hearing aids, earbuds, etc.) may enable or enhance hearing by providing audio content received by the hearing device to a user. In certain examples, hearing devices may be configured to process a received input sound signal (e.g., ambient sound) and provide the processed input sound signal to the user (e.g., by way of a receiver (e.g., a speaker) placed in the user's ear canal or at any other suitable location). In addition, such hearing devices are typically customized for a user based on various factors associated with the user such as the user's particular hearing loss characteristics, the desired components of the customized hearing device, aesthetic preferences of the user, and/or the amount of ear space (e.g., within an ear canal of the user) available to receive the customized hearing device.

A customized hearing device typically includes a shell that may house various components of the hearing device, in particular an electro-acoustic transducer in the form of a so-called receiver for reproducing electric audio signals as sound, and that is configured to fit at least partially within the ear canal of a user. The shell may be attached directly to the hearing device or it may be a part of an earpiece of the hearing device which is intended to be at least partially inserted into the ear canal. A shell for a hearing device is typically made of either a rigid material such as acrylic or titanium or a soft material such as silicone or polyurethane. A customized shell may improve placement and/or retention of the hearing device in the ear canal as compared to non-customized shells due to increased surface area contact of the customized shell with respect to a wall of the ear canal. However, even with such improved placement and/or retention, a customized shell made of acrylic or titanium is still susceptible to acoustic feedback due to being uniformly rigid and poor retention and/or migration. In addition, a customized shell made of a soft material is also susceptible to poor retention and/or migration due to changes that may occur in ear canal shape during use of the hearing device. For example, jaw movements (e.g., due to chewing or talking) may modulate space within the ear canal and negatively affect retention of the shell within the ear canal. Because shells made of soft material such as silicone or polyurethane are basically incompressible in one or more areas, such jaw movements may decrease space in certain areas of the ear canal and push the wall of the ear canal against the shell. This may increase pressure felt by the user in those areas, resulting in discomfort to the user and/or reduced wearability of the hearing device.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
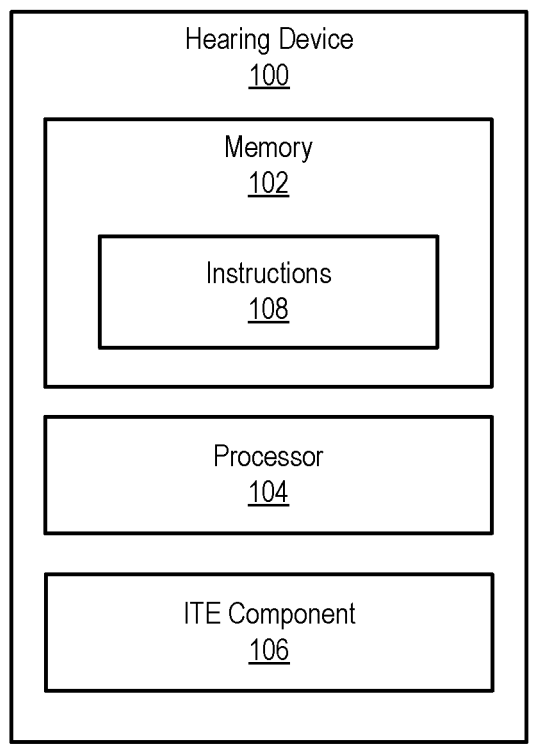
FIG. 1 illustrates an exemplary hearing device according to principles described herein.

Hearing devices having a shell that includes a compressible region and methods of manufacturing the same are described herein. Such hearing devices may be configured to facilitate hearing by a user. As will be described in more detail below, an exemplary hearing device may comprise an ITE component comprising a shell that is custom formed of a soft material by additive manufacturing to fit at least partially within an ear canal of the user. The ITE component is also sometimes referred to as an earpiece of the hearing device. The shell of the ITE component may include a compressible region provided along an outer surface of the shell that is configured to contact a wall of the ear canal. The compressible region may be compressible due to a cavity that is located within the shell in the compressible region and that is configured to be compressed when the ear canal deforms while the ITE component is inserted within the ear canal of the user. The compressible region may have a comparatively higher compressibility than other regions of the shell provided along the outer surface of the shell. Some embodiments may have a shell having an incompressible region provided along the outer surface of the shell that is configured to contact a wall of the ear canal. Some embodiments may have a shell that is made from a material that is soft but incompressible. As used herein, the expression "compressible" may refer to a deformation that includes a change of volume as opposed to a displacement of material as in bending a soft and/or flexible but incompressible material.

By providing hearing devices such as those described herein, it may be possible to improve retention and/or wearing comfort of an ITE component within an ear canal of a user even when the geometry of the ear canal changes (e.g., due to jaw movements) during use of the hearing device. In addition, because hearing devices such as those described herein include shells having a compressible region, it may be possible to maintain tactile push-ability of the ITE component while increasing comfort and wearability of the ITE component as compared to conventional ITE components. Moreover, hearing devices such as those described herein that include shells having a compressible region may have improved acoustic performance because they may be less likely to have an acoustic feedback problem while the hearing device is worn by a user (e.g., during mastication or speaking). Other benefits of the hearing devices and methods described herein will be made apparent herein.

As will be described further herein, hearing devices manufactured according to principles described herein include a customized shell that is formed by an additive manufacturing process and that includes a compressible region. As used herein, a "hearing device" may be implemented by any device or combination of devices configured to output sound to a user and that includes components that are worn at least partially in an ear canal of the user. For example, a hearing device may be implemented by a hearing aid configured to amplify audio content to a recipient, a sound processor included in a cochlear implant system configured to apply electrical stimulation representative of audio content to a recipient, a sound processor included in a stimulation system configured to apply electrical and acoustic stimulation to a recipient, or any other suitable hearing prosthesis. In some examples, a hearing device may be implemented by an ITE component configured to at least partially be inserted within an ear canal of a user. In some examples, a hearing device may include a combination of an ITE component, a BTE component, and/or any other suitable component.

In certain examples, hearing devices such as those described herein may be implemented as part of a binaural hearing system. Such a binaural hearing system may include a first hearing device associated with a first ear of a user and a second hearing device associated with a second ear of a user. In such examples, the hearing devices may each be implemented by any type of hearing device configured to provide or enhance hearing to a user of a binaural hearing system. In some examples, the hearing devices in a binaural system may be of the same type. For example, the hearing devices may each be hearing aid devices. In certain alternative examples, the hearing devices may be of a different type. For example, a first hearing device may be a hearing aid and a second hearing device may be a sound processor included in a cochlear implant system.

In some examples, a hearing device may additionally or alternatively include earbuds, headphones, hearables (e.g., smart headphones), and/or any other suitable device that may be used to provide sound to a user. In such examples, the user may correspond to either a hearing impaired user or a non-hearing impaired user.

FIG. 1 illustrates an exemplary hearing device 100 that is configured to assist a user in hearing. As shown, hearing device 100 may include, without limitation, a memory 102, a processor 104, and an ITE component 106 selectively and communicatively coupled to one another. Memory 102 and processor 104 may each include or be implemented by hardware and/or software components (e.g., processors, memories, communication interfaces, instructions stored in memory for execution by the processors, etc.). In some examples, memory 102 and processor 104 may be housed within or form part of ITE component 106. In some examples, memory 102 and processor 104 may be located separately from ITE component 106 (e.g., in a BTE component). In some alternative examples, memory 102 and processor 104 may be distributed between multiple devices (e.g., multiple hearing devices in a binaural hearing system) and/or multiple locations as may serve a particular implementation.

Memory 102 may maintain (e.g., store) executable data used by processor 104 to perform any of the operations associated with hearing device 100. For example, memory 102 may store instructions 108 that may be executed by processor 104 to perform any of the operations associated with hearing device 100 assisting a user in hearing. Instructions 108 may be implemented by any suitable application, software, code, and/or other executable data instance.

Memory 102 may also maintain any data received, generated, managed, used, and/or transmitted by processor 104. For example, memory 102 may maintain any suitable data associated with a hearing loss profile of a user, fitting parameters used to fit hearing device 100 to the user, etc. Memory 102 may maintain additional or alternative data in other implementations.

Processor 104 is configured to perform any suitable processing operation that may be associated with hearing device 100. For example, when hearing device 100 is implemented by a hearing aid device, such processing operations may include monitoring ambient sound and/or representing sound to a user via an in-ear receiver. Processor 104 may be implemented by any suitable combination of hardware and software.

Figure 2:
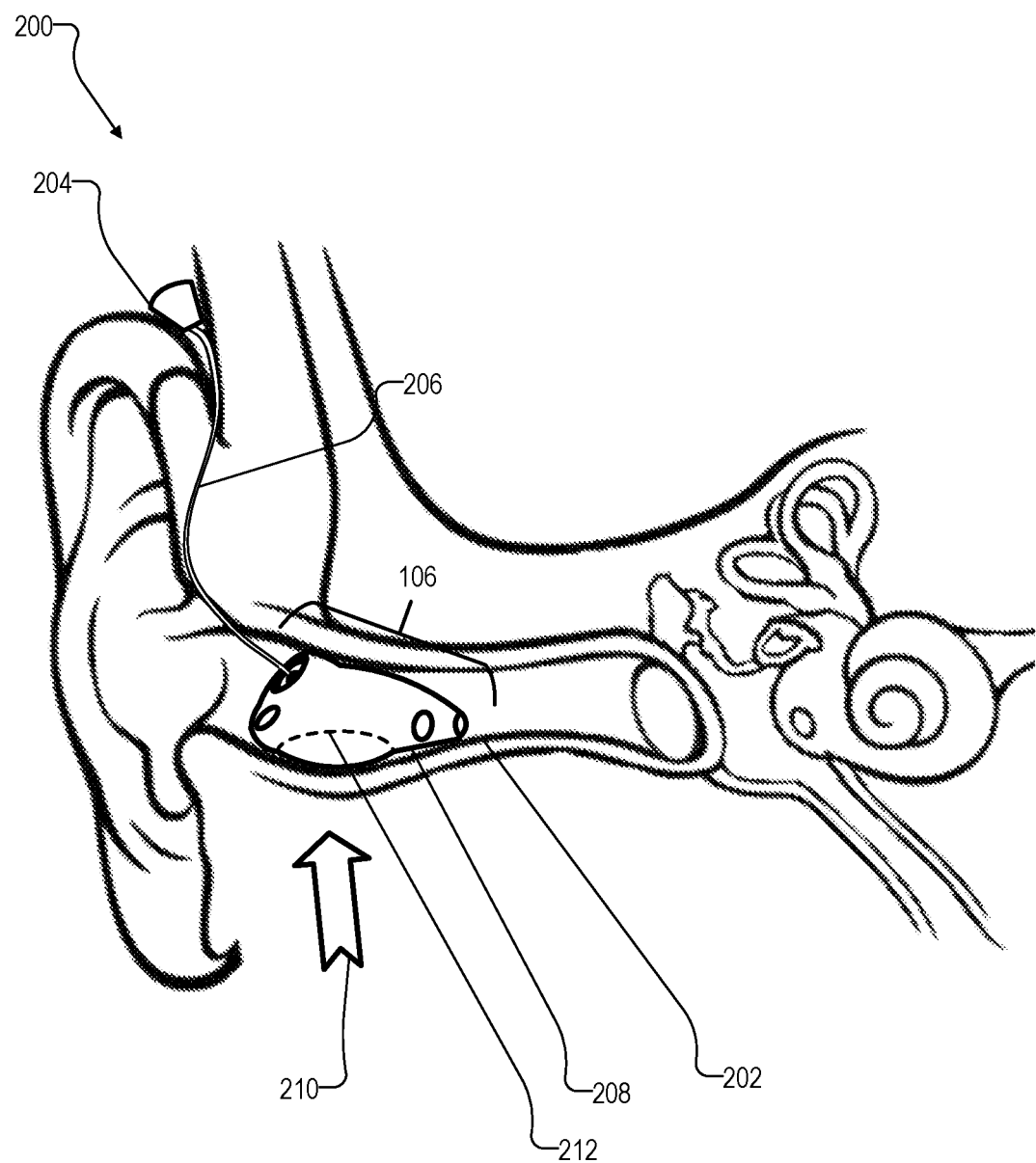
FIG. 2 illustrates an exemplary implementation of an in-the-ear ("ITE") component of a hearing device according to principles described herein.

FIG. 2 shows an exemplary implementation 200 of ITE component 106. As shown in FIG. 2, ITE component 106 may be inserted at least partially within an ear canal 202 of a user while ITE component 106 is worn by the user. In the example shown in FIG. 2, ITE component 106 is connected to a BTE component 204 by way of a cable 206.

As shown in FIG. 2, ITE component 106 includes a shell 208 that may be custom formed by additive manufacturing to fit at least partially within the ear canal 202 of the user. As used herein, "additive manufacturing" refers to a process in which material is deposited (e.g., layer by layer) or arranged in precise locations to form an object. Additive manufacturing as used herein does not include casting or molding processes. Shell 208 may be custom formed using any suitable additive manufacturing process as may serve a particular implementation. For example, shell 208 may be three-dimensionally ("3D") printed to uniquely fit within ear canal 202 of the user shown in FIG. 2. Examples of additive manufacturing technologies that may be used to form shell 208 may include, for example, Digital Light Processing ("DLP"), Stereolithography ("SLA"), Fusion Deposition Modeling ("FDM"), Selective Laser Sintering ("SLS"), volumetric printing, or any other suitable additive manufacturing methodology.

Shell 208 may be formed of any suitable soft resilient material as may serve a particular implementation. For example, shell 208 may be formed of silicone, polyurethane, and/or methacrylate in certain examples. In certain examples, the material used to form shell 208 may have a softness of approximately Shore A 20-80 on the Durometer Shore A Hardness Scale. In certain alternative implementations, the material used to form shell 208 may have a softness of approximately Shore A 50-60 on the Durometer Shore A Hardness Scale.

ITE component 106 may be configured to fulfill two competing needs, retention within ear canal 202 and comfort for the user. With retention, it is desirable that ITE component 106 remains substantially fixed during all activities that may be performed by the user such as during eating, speaking, moving, etc. Such retention is desirable because a good seal by ITE component 106 along the circumference of ear canal 202 further enhances acoustic performance. With comfort, it is desirable to configure ITE component 106 such that the user does not feel discomfort during use of hearing device 100.

While ITE component 106 is inserted within ear canal 202, the natural shape of ear canal 202 may change. For example, jaw movements may cause the temporomandibular joint to deform ear canal 202 in the direction of arrow 210 in FIG. 2. In conventional ITE components, such movement may cause discomfort to the user even though the conventional ITE components may be made of a soft material (e.g., silicone). This is because a material such as silicone is substantially incompressible. However, ITE component 106 includes a compressible region 212 that is provided along an outer surface of shell 208 and that is configured to contact a wall of ear canal 202. Compressible region 212 may be compressible due to a cavity (not shown) that is located within shell 208 in compressible region 212. Such a cavity may be configured to be compressed and deformed when ear canal 202 deforms while ITE component 106 is inserted within ear canal 202. ITE component 106 may include any suitable number of cavities in a compressible region as may serve a particular implementation. For example, ITE component 106 may include a single cavity in compressible region 212. Alternatively, ITE component 106 may include two or more cavities in compressible region 212 in certain implementations.

Although only one compressible region 212 is illustrated in FIG. 2, it is understood that shell 208 of ITE component 106 may include any suitable number of compressible regions as may serve a particular implementation. For example, ITE component 106 may include a first compressible region (e.g., compressible region 212) and a second compressible region that may be separate from the first compressible region. In certain examples, the compressible regions of a shell of ITE component 106 may have the same level or amount of compressibility. Alternatively, the compressible regions may have different levels or amounts of compressibility. For example, the first compressible region may be relatively more easily compressible than the second compressible region.

In certain examples, the soft material that forms shell 208 may be at least one order of magnitude less compressible than compressible region 212 (e.g., less compressible than the fluid or gas within the cavity in compressible region 212). In certain alternative examples, the soft material that forms shell 208 may be more than three orders of magnitude less compressible than compressible region 212. In certain examples, the soft material that forms shell 208 may be between 3-5 orders of magnitude less compressible than compressible region 212.

In certain examples, cavities such as those described herein may be filled with a gas such as air. With such a configuration, the air within the cavity may compress when the shape of ear canal 202 changes, leading to compression of compressible region 212. In certain examples, cavities such as those described herein may be filled with another compressible fluid as e.g., any suitable type of gas other than air. For example, cavities such as those described herein may be filled with nitrogen in certain examples. In certain alternative examples, a cavity may be filled partially or fully with a foam that facilitates compressible region 212 compressing due to a change in the dimensions of ear canal 202.

Compressible region 212 may have any suitable number of cavities as may serve a particular implementation. In certain examples, compressible region 212 or shell 208 may have only one cavity, only two cavities, or only three cavities. In certain examples, compressible region 212 or shell 208 may have no more than eight total cavities. In certain alternative examples, compressible region 212 or shell 208 may have no more than four total cavities.

Cavities such as those described herein may have any suitable size and/or shape as may serve a particular implementation. In certain examples, a cavity may be at least one millimeter across (e.g., when viewed in cross section). In certain alternative examples, a cavity may be two or more millimeters across (e.g., when viewed in cross section). In certain examples, cavities such as those described herein may define an inner volume of approximately 0.5 cubic millimeters. (e.g., corresponding to a sphere having a diameter of approximately one millimeter). In certain examples, a cavity may define inner volume of approximately four cubic millimeters (e.g., corresponding to a sphere having a diameter of approximately two millimeters). It is understood that macroscopic cavities such as those described herein are distinguished at least based on size from microscopic cavities such as those that may be found in, for example, a compressible foam structure. Examples of cavities that may be provided within a shell of an ITE component are described herein.

Compressible region 212 may be located at any suitable portion of shell 208 as may serve a particular implementation. For example, compressible region 212 may be located on shell 208 such that, when ITE component 106 is worn by the user, compressible region 212 contacts a portion of ear canal 202 that changes shape with jaw movements of the user. Additionally or alternatively, compressible region 212 may be positioned at a location that is configured to contact a bend in ear canal 202 or at any other suitable location.

In the example shown in FIG. 2, compressible region 212 is defined by a dashed line boundary on an outer surface of shell 208. Portions of shell 208 that are outside of the dashed line boundary may be either less compressible than compressible region 212 or not compressible at all. In certain examples, shell 208 may be configured to not deform in a cartilaginous part of ear canal 202 to provide good retention within ear canal 202. However, to keep an acoustic seal and improve retention while being comfortable for the user, shell 208 may be configured to be compressible in compressible region 212 were ear canal 202 deforms (e.g., due to jaw movements).

In the example shown in FIG. 2, the boundary of compressible region 212 that is indicated by the dashed line is provided for illustrative purposes. It is understood that in certain implementations shell 208 may or may not include a visible boundary that separates compressible region 212 from other portions of shell 208.

Figure 3:
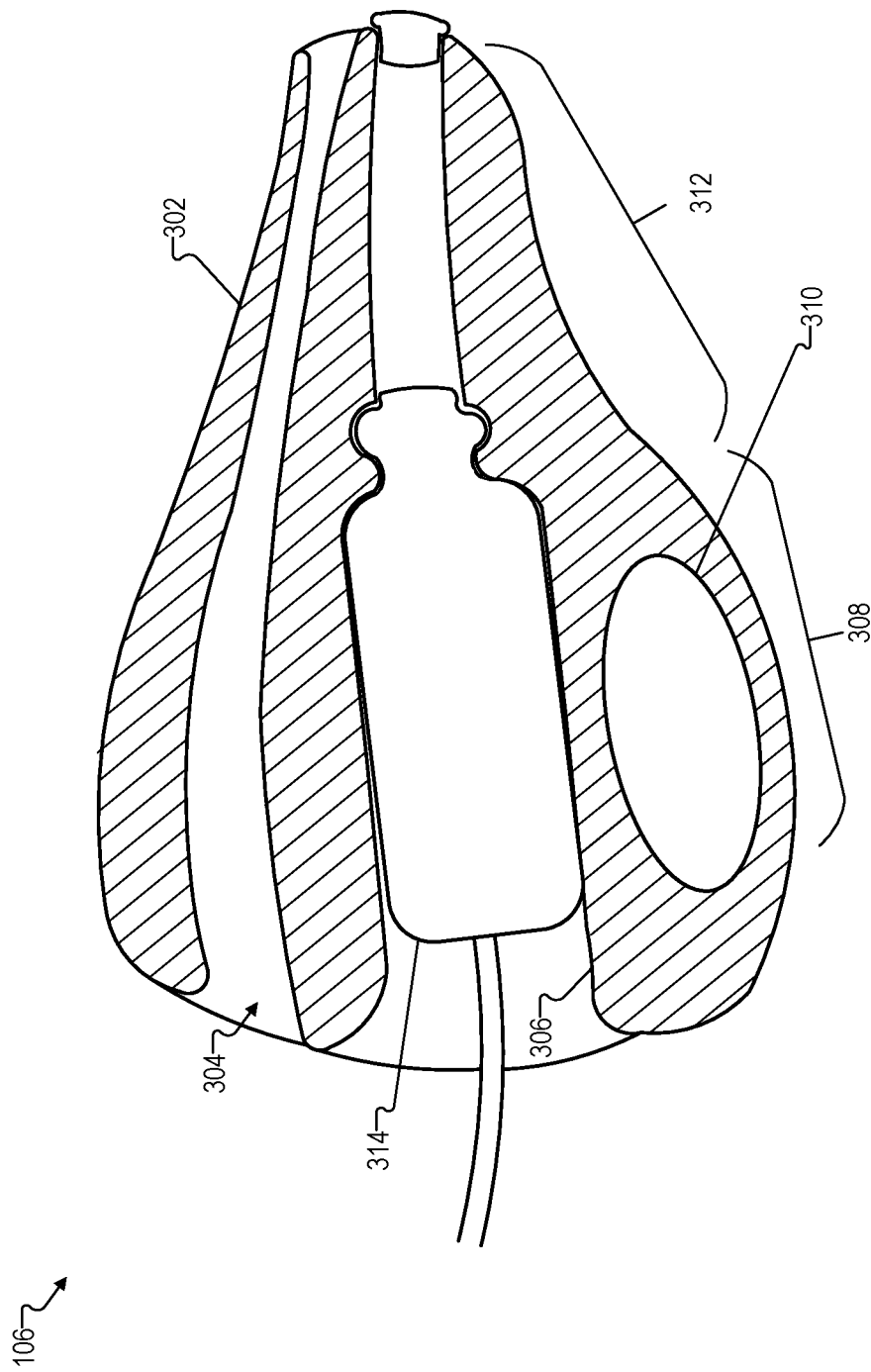
FIGS. 3-6 illustrate exemplary cross sections of different configurations of ITE components that may be implemented according to principles described herein.

FIG. 3 illustrates a cross sectional view of an exemplary configuration of ITE component 106 that may be implemented in certain examples. As shown in FIG. 3, ITE component 106 may include a shell 302 that may be formed of any suitable soft material such as described herein. Shell 302 includes a vent channel 304, an elongate receptacle 306 that extends along a longitudinal length of shell 302, and compressible region 308 where a cavity 310 is located within shell 302. In the example shown in FIG. 3, cavity 310 is completely encapsulated or embedded within shell 302 and is surrounded by the material of shell 302. Cavity 310 is configured to be compressed when ear canal 202 deforms while ITE component 106 is worn by a user. Cavity 310 is shown as having an oval shaped cross section in FIG. 3. However, it is understood that cavities such as those described herein may have any suitable size and/or shape as may serve a particular implementation.

In the example shown in FIG. 3, compressible region 308 and cavity 310 only extend along a portion of the longitudinal length of shell 302. A portion 312 of shell 302 to the right of compressible region 308 in FIG. 3 may be considered as a region that is relatively less compressible than compressible region 308 or that is not compressible (e.g., incompressible) due to the type of material used to form shell 302. In certain examples, portion 312 of shell 302 to the right of compressible region 308 may correspond to a portion of shell 302 that is configured to contact a cartilaginous part of ear canal 202 while ITE component is worn by a user. Portion 312 is shown in FIG. 3 as merely an example where either a less compressible or an incompressible region of a shell may be located in certain implementations. In is understood that a less compressible or an incompressible region may be positioned in other areas in other implementations. For example, a portion of shell 302 to the left of compressible region 308 may correspond to a less compressible or an incompressible region in certain examples. Additionally or alternatively, all or part of a surface on an upper side of shell 302 shown in FIG. 3 may correspond to a less compressible or an incompressible region in certain examples.

In the example shown in FIG. 3, a housing 314 is positioned within elongate receptacle 306. Housing 314 may include any suitable component (e.g., a receiver, communication devices, batteries, sensors, sound or air tube, etc.) that may be associated with ITE component 106.

Figure 4:
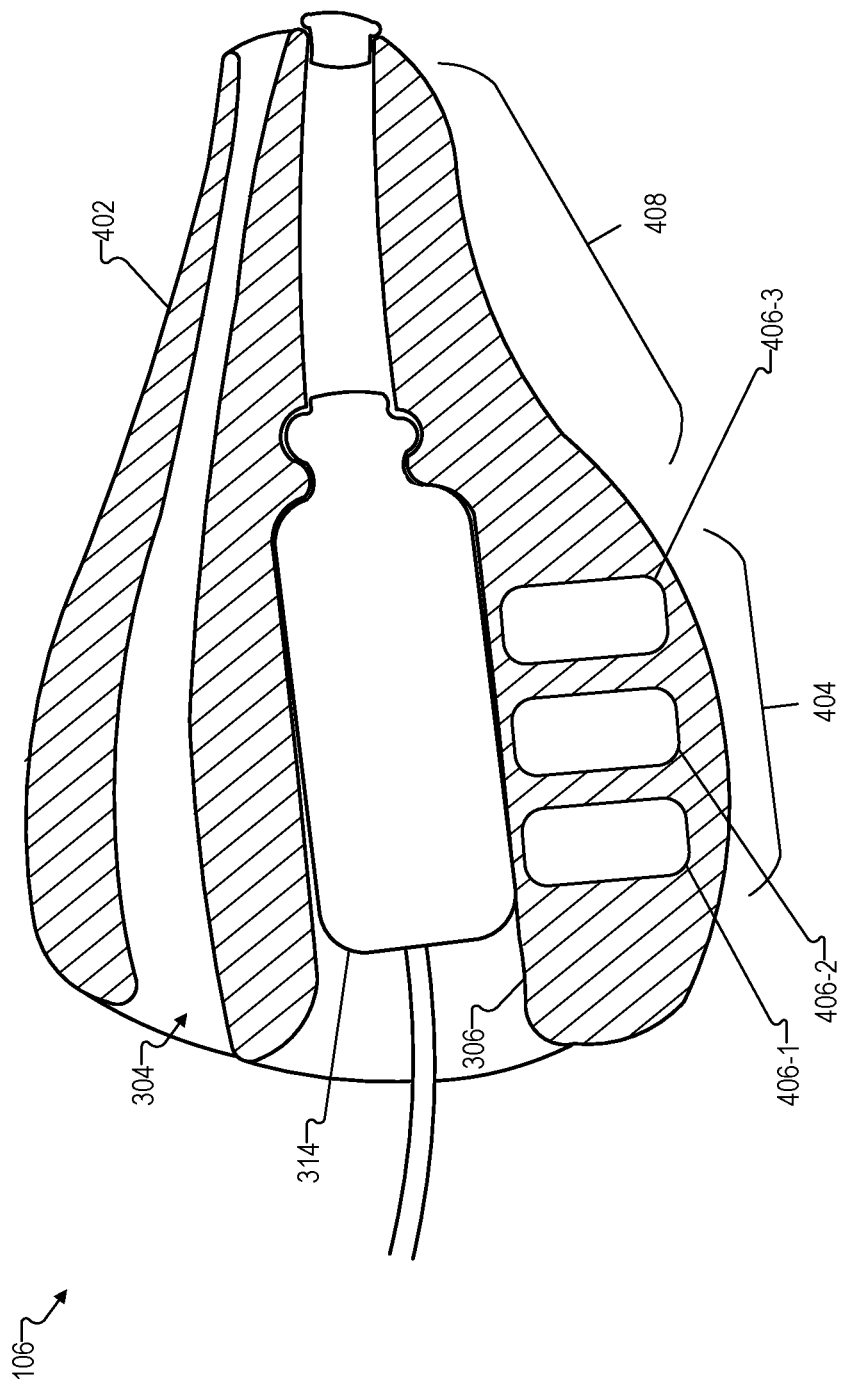

FIG. 4 illustrates a cross sectional view of an additional exemplary configuration of ITE component 106 that may be implemented in certain examples. As shown in FIG. 4, ITE component 106 may include a shell 402 that may be formed of any suitable soft material such as described herein. Shell 402 is similar to shell 302 in that shell 402 includes vent channel 304 and elongate receptacle 306 that extends along a longitudinal length of shell 402. However, shell 402 includes a compressible region 404 where a plurality of cavities (e.g., cavities 406-1 through 406-3) are located within shell 402. Cavities 406 may be configured to be compressed and deformed when ear canal 202 deforms while ITE component 106 is inserted within ear canal 202. Portion 408 shown in FIG. 4 may correspond to either a less compressible or an incompressible region of shell 402.

Figure 5:
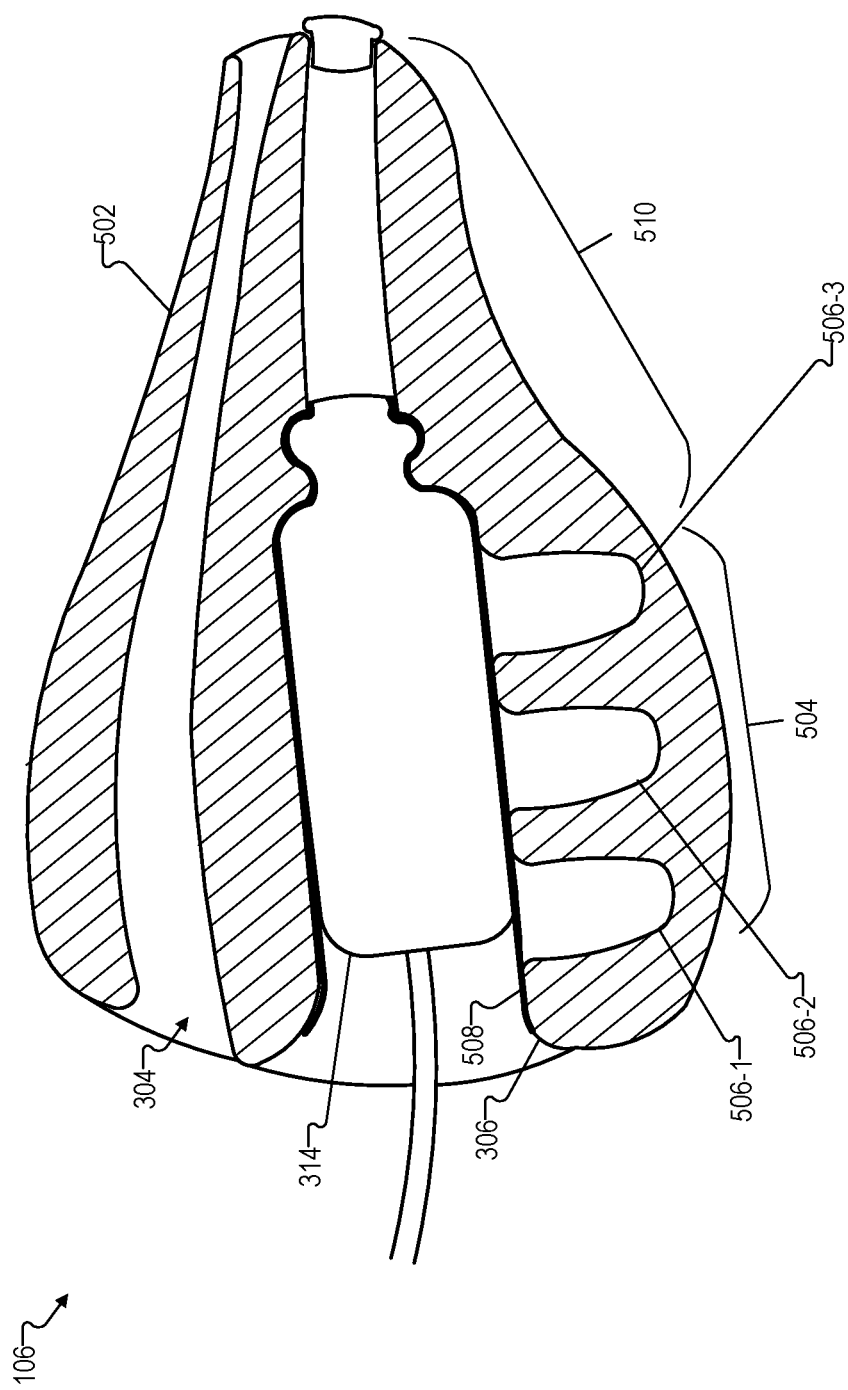

In certain examples, one or more cavities within a shell of ITE component 106 may be open on one end to elongate receptacle 306. In such examples, the one or more cavities may be sealed on the one end by an object that is inserted within elongate receptacle 306. To illustrate an example, FIG. 5 shows another exemplary configuration of ITE component 106. As shown in FIG. 5, ITE component 106 may include a shell 502 that includes a compressible region 504 having a plurality of cavities 506 (e.g., cavities 506-1 through 506-3). Cavities 506 are each open on one end to elongate receptacle 306. However, in the example shown in FIG. 5, a sleeve 508 is provided within elongate receptacle 306 to seal cavities 506. Housing 314 is provided within sleeve 508. Portion 510 shown in FIG. 5 may correspond to either a less compressible or an incompressible region of shell 502.

In certain examples, sleeve 508 and/or elongate receptacle 306 may include one or more sleeve insertion guides to facilitate proper placement of sleeve 508 within elongate receptacle 306. For example, sleeve 508 may include one or more ribs on an external surface thereof that are configured to be received by one or more corresponding grooves on a surface of elongate receptacle 306.

Figure 6:
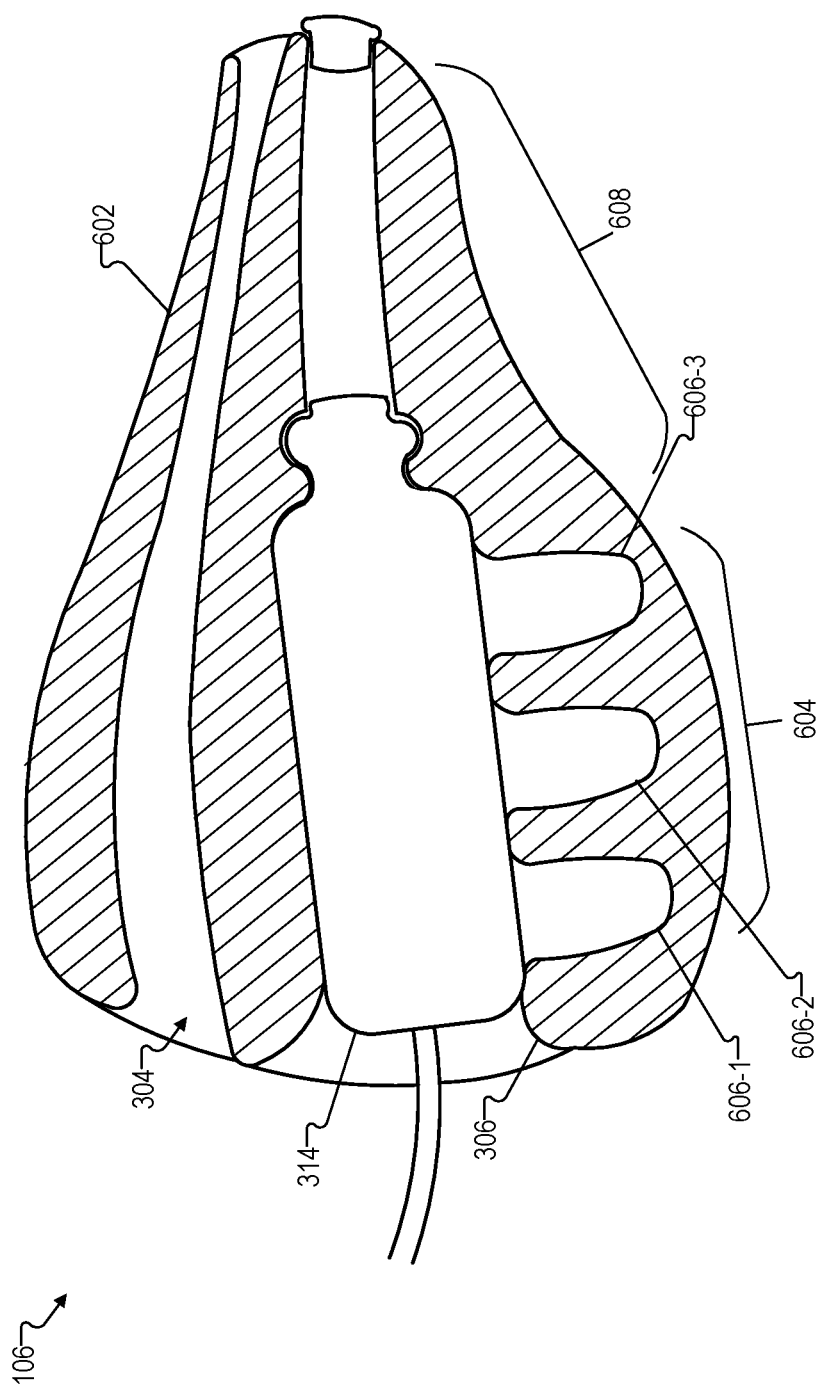

In certain examples, a housing such as housing 314 may be used to seal one or more cavities within a shell instead of a sleeve such as sleeve 508. To illustrate, FIG. 6 shows another exemplary configuration where housing 314 is configured to seal cavities. As shown in FIG. 6, ITE component 106 may include a shell 602 that includes a compressible region 604 that includes a plurality of cavities 606 (e.g., cavities 606-1 through 606-3) that are formed within shell 602. As shown in FIG. 6, each of cavities 606 may be open on one end to elongate receptacle 306. However, in the example shown in FIG. 6, housing 314 is configured to seal cavities 606 instead of an additional object such as sleeve 508. Portion 608 of shell 602 shown in FIG. 6 may correspond to either a less compressible or an incompressible region of shell 602.

Figure 7:
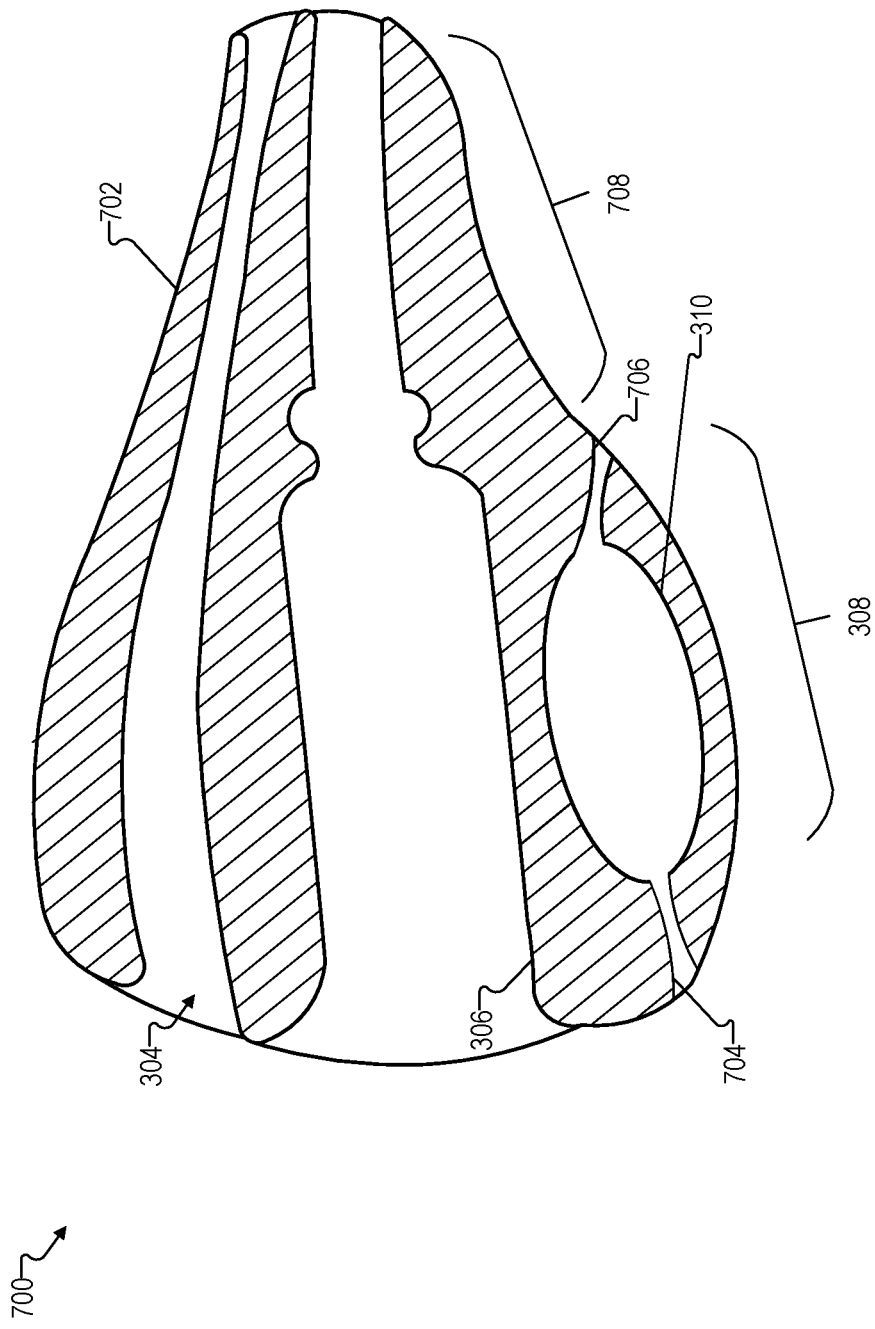
FIGS. 7-10 illustrate exemplary cross sections of different configurations of semifinished shells that may be implemented according to principles described herein.

In certain examples, the process for additively manufacturing a shell of ITE component 106 may result in excess (e.g., uncured) material being located within a cavity of the shell. In such examples, one or more openings may be provided into the cavity to facilitate removing the excess material. For example, the shell may include an inlet connecting the cavity to an exterior of the shell and an outlet connecting the cavity to an exterior of the shell. To illustrate, FIG. 7 shows an exemplary implementation 700 of a semi-finished shell 702 that may be used to form shell 302 shown in FIG. 3. As shown in FIG. 7, an inlet 704 may connect an exterior of shell 702 to cavity 310 and an outlet 706 may connect cavity 310 to the exterior of shell 702. The excess material that may be located within cavity during manufacture may be expelled from cavity 310 in any suitable manner. For example, pressurized air may be injected into inlet 704 to expel the excess material out of outlet 706. Additionally or alternatively, centrifugation may be used to expel excess material from cavity 310 of semifinished shell 702. Additionally or alternatively, washing liquids such as isopropanol, ethyl acetate, or acetone may be provided into inlet 704 to wash the excess material out of outlet 706. Portion 708 of shell 702 shown in FIG. 7 may correspond to either a less compressible or an incompressible region of shell 702.

Semifinished shell 702 may be considered as being only partially finished due to the presence of inlet 704 and outlet 706. After the excess material is removed, inlet 704 and outlet 706 may be closed in any suitable manner (e.g., using glues, plugs, lacquers, resins, etc.) to result, for example, in the configuration of cavity 310 shown in FIG. 3.

Figure 8:
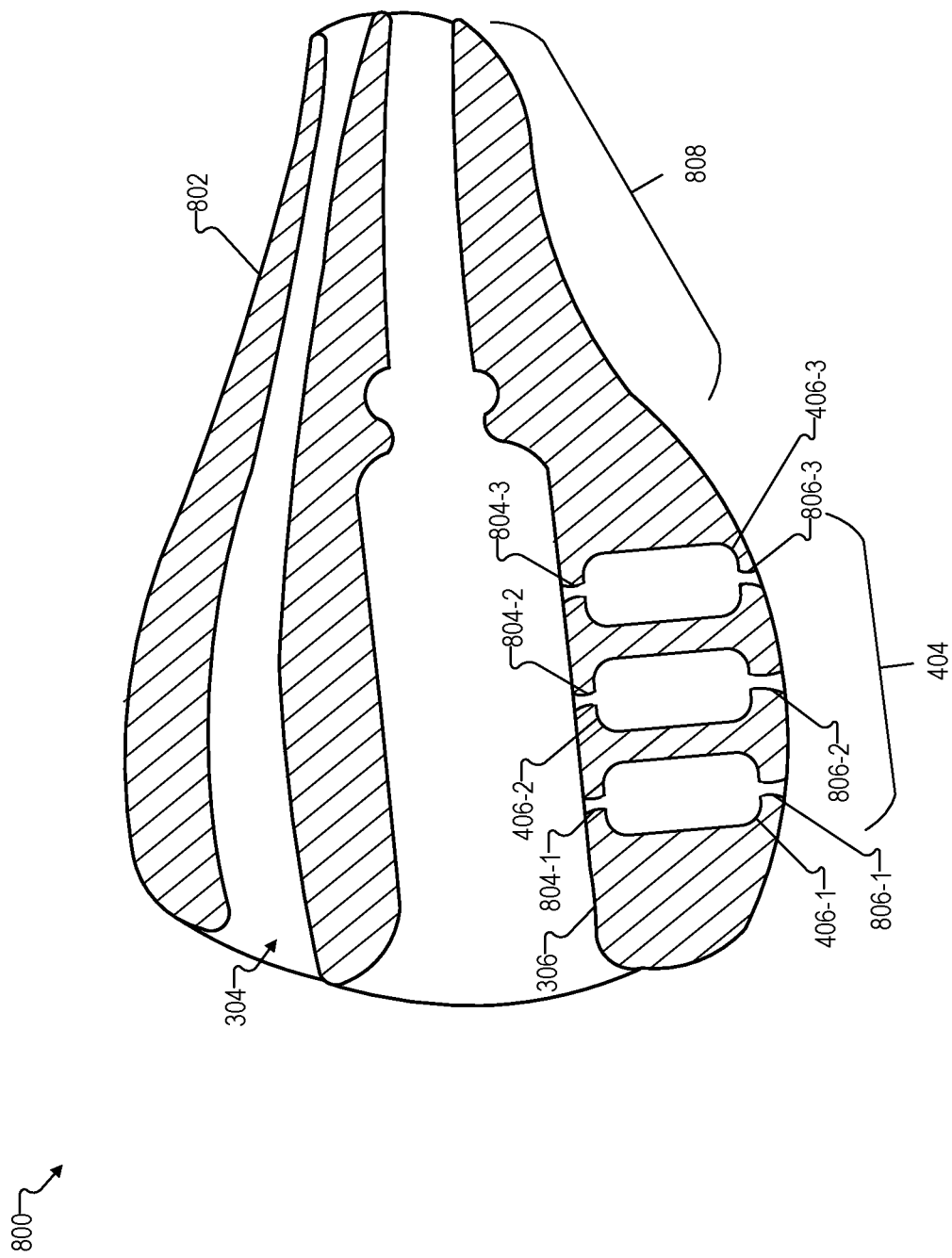

FIG. 8 shows an additional exemplary implementation 800 of a semifinished shell 802 that may be used to form shell 402 shown in FIG. 4. As shown in FIG. 8, a plurality of inlets 804 (e.g., inlets 804-1 through 804-3) connect cavities 406 to an exterior of semifinished shell 802 by way of elongate receptacle 306. For example, inlet 804-1 connects cavity 406-1 to the exterior of semifinished shell 802, inlet 804-2 connects cavity 406-2 to the exterior of semi-finished shell 802, and inlet 804-3 connects cavity 406-3 to the exterior of semifinished shell 802. In addition, a plurality of outlets 806 (e.g., outlets 806-1 through 806-3) connect cavities 406 to the exterior of semifinished shell 802. For example, outlet 806-1 connects cavity 406-1 to the exterior of semifinished shell 802, outlet 806-2 connects cavity 406-2 to the exterior of semifinished shell 802, and outlet 806-3 connects cavity 406-3 to the exterior of semifinished shell 802. In certain examples, excess material left in cavities 406 may be removed from cavities 406 in any suitable manner such as described herein. After the excess material is removed, inlets 804 and outlets 806 may be closed in any suitable manner such as described herein to result, for example, in the configuration of cavities 406 shown in FIG. 4. Portion 808 of shell 802 shown in FIG. 8 may correspond to either a less compressible or an incompressible region of shell 802.

Figure 9:
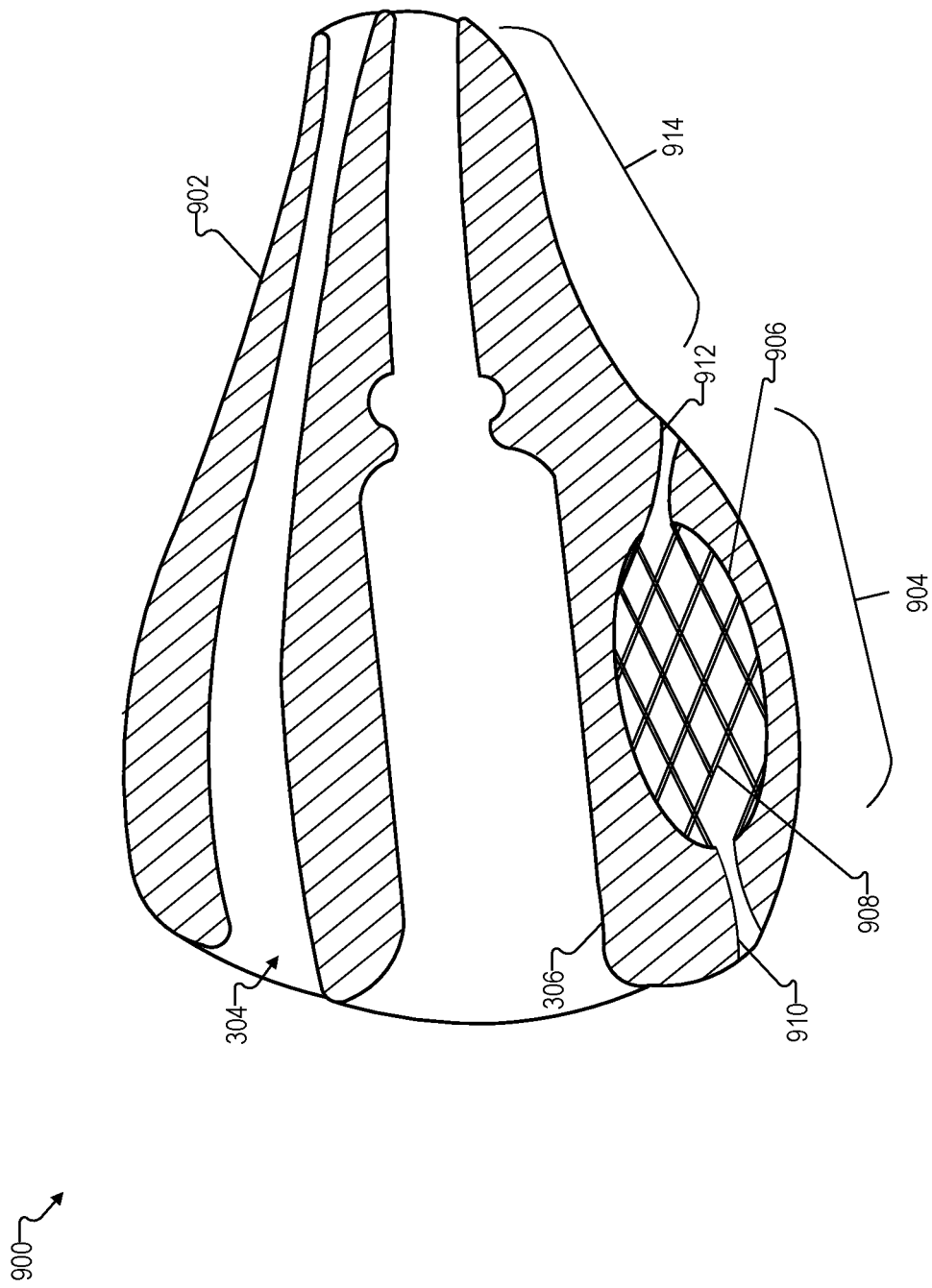

In certain examples, a support structure may be provided within a cavity of a shell of an ITE component. The properties of such a support structure may be specifically selected based on a desired amount of compressibility of a compressible region. Such a support structure may be configured in any suitable manner. For example, in certain implementations, a support structure may include at least one of a lattice support structure, a tree-like support structure, a beam structure, and/or a strut structure. To illustrate, FIG. 9 shows another exemplary configuration 900 of a semifinished shell 902 that may be implemented in certain examples. As shown in FIG. 9, shell 902 includes a compressible region 904 that includes a cavity 906. Within cavity 906, a lattice structure 908 is provided to give structural support to cavity 906. In certain examples, the amount and/or the thicknesses of the lattices included in lattice structure 908 may be specifically selected based on a desired amount of compressibility of compressible region 904. As shown in FIG. 9, semifinished shell 902 also includes an inlet 910 connecting cavity 906 to an exterior of semifinished shell 902 and an outlet 912 connecting cavity 906 to the exterior of semifinished shell 902. Inlet 910 and outlet 912 may be used in any suitable manner such as described herein to remove excess material from cavity 906 during manufacture. Portion 914 of shell 902 shown in FIG. 9 may correspond to either a less compressible or an incompressible region of shell 902.

Figure 10:
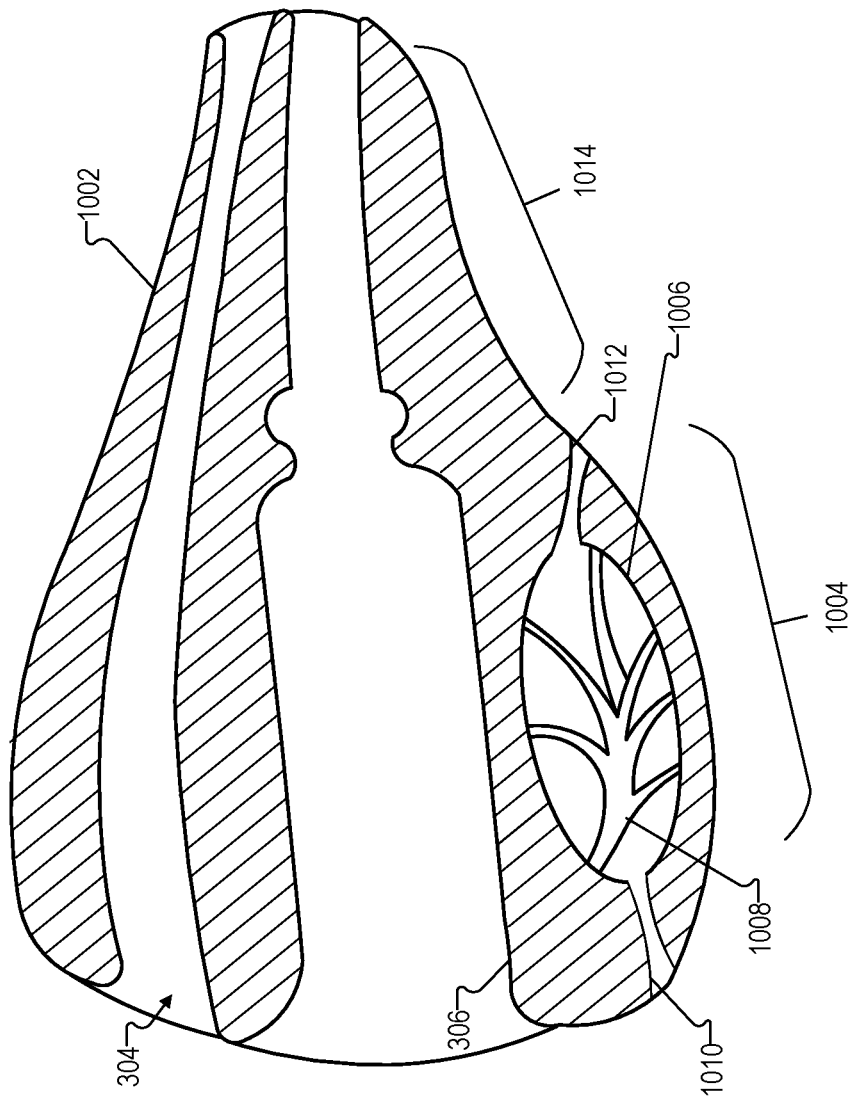

FIG. 10 shows an additional exemplary configuration 1000 of a semifinished shell 1002 that may be implemented in certain examples. As shown in FIG. 10, semifinished shell 1002 includes a compressible region 1004 that includes a cavity 1006 in which a tree-like structure 1008 is provided to give structural support to cavity 1006. In certain examples, the amount and/or thicknesses of the branches included in tree-like structure 1008 may be specifically selected based on a desired amount of compressibility of compressible region 1004. As shown in FIG. 10, semifinished shell 1002 also includes an inlet 1010 connecting cavity 1006 to an exterior of semifinished shell 1002 and an outlet 1012 connecting cavity 1006 to the exterior of semifinished shell 1002. Inlet 1010 and outlet 1012 may be used in any suitable manner such as described herein to remove excess material from cavity 1006 during manufacture. Portion 1014 of shell 1002 shown in FIG. 10 may correspond to either a less compressible or an incompressible region of shell 1002.

In certain examples, a support structure such as described herein may be provided on an inner surface of a cavity and may only extend partially into the cavity to stiffen the inner surface of the cavity. For example, in certain implementations, lattice structure 908 may only extend partially towards a center of cavity 906 to stiffen the inner surface of cavity 906. In such examples, a central region of cavity 906 may not include any lattices or other support structure.

Figure 11:
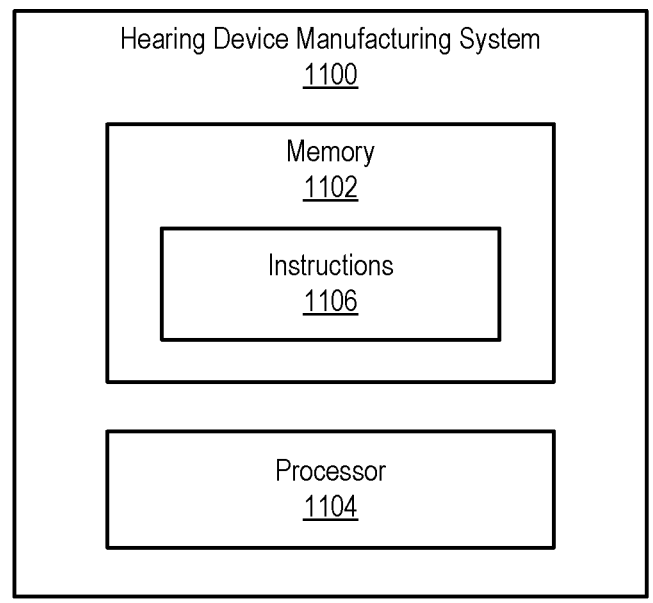
FIG. 11 illustrates an exemplary hearing device manufacturing system that may be used to manufacture the hearing device illustrated in FIG. 1 according to principles described herein.

A shell of ITE component 106 such as any of those described herein may be manufactured using any suitable manufacturing process as may serve a particular implementation. FIG. 11 shows an exemplary hearing device manufacturing system 1100 ("system 1100") that may be used to manufacture hearing device 100 including the shell of ITE component 106.

As shown in FIG. 11, system 1100 may include, without limitation, a memory 1102 and a processor 1104 selectively and communicatively coupled to one another. Memory 1102 and processor 1104 may each include or be implemented by hardware and/or software components (e.g., processors, memories, communication interfaces, instructions stored in memory for execution by the processors, etc.). In some examples, memory 1102 and processor 1104 may be housed within or form part of a single computing device configured to control a manufacturing process of a shell of ITE component 106. In some alternative examples, memory 1102 and processor 1104 may be distributed between multiple devices and/or multiple locations as may serve a particular implementation.

Memory 1102 may maintain (e.g., store) executable data used by processor 1104 to perform any of the operations associated with manufacturing a shell of ITE component 106. For example, memory 1102 may store instructions 1106 that may be executed by processor 1104 to perform any of the operations associated with forming one or more cavities within a shell of an ITE component. Instructions 1106 may be implemented by any suitable application, software, code, and/or other executable data instance.

Memory 1102 may also maintain any data received, generated, managed, used, and/or transmitted by processor 1104. For example, memory 1102 may maintain any suitable data associated with shapes of shells, scans of ear canals of particular users, ear canal shape data, processing parameters used to generate deformable and/or compressible regions of shells with different moduli of elasticity, hearing device components, etc. Memory 1102 may maintain additional or alternative data in other implementations.

Processor 1104 is configured to perform any suitable processing operation that may be associated with manufacturing ITE component 106 of hearing device 100. Processor 1104 may be implemented by any suitable combination of hardware and software.

As described above, the shell of ITE component 106 may be custom formed for the user to fit at least partially within an ear canal of a user. In such examples, system 1100 may access, generate, or otherwise obtain any information that defines one or more spaces associated with an ear of a user where a customized hearing device may be worn by the user.

In certain examples, system 1100 may generate or otherwise obtain a 3D scan of an ear of a user. Such a 3D scan may define an available amount of space within an ear canal of the user where ITE component 106 of a customized hearing device may be inserted.

System 1100 may obtain a 3D scan in any suitable manner. In certain implementations, system 1100 may generate a 3D scan by directly scanning an ear of a user. For example, system 1100 may use any suitable 3D scanning device to directly scan the recesses, contours, etc. of an ear of the user to generate a 3D scan. In certain examples, system 1100 may use a 3D scanner to directly scan inside an ear canal of the user. In such examples, a 3D scan may provide information indicating an amount of space available within the ear canal for a customized hearing device.

In certain examples, system 1100 may obtain multiple 3D scans of an ear canal of a particular user to facilitate manufacturing ITE component 106. For example, system 1100 may obtain a first 3D scan of the ear canal while the jaw of the user is in a first state, a second 3D scan of the ear canal while the jaw of the user is in a second state, and a third 3D scan of the ear canal while the jaw of the user is in a third state. The first, second, and third states may correspond to any suitable state of the jaw of the user that may be useful to provide information regarding changes that may occur in the shape of the ear canal as a result of jaw position or movement. For example, the first state may correspond to an open mouth state, the second state may correspond to a clenched jaw state, and the third state may correspond to a closed mouth state. System 1100 may compare the first 3D scan, the second 3D scan, and the third 3D scan in any suitable manner to determine where the shape of the ear canal of the user changes as a result of the different states of the jaw of the user. System 1100 may then use such information to determine suitable positions of one or more compressible regions of a shell of ITE component 106.

In certain alternative implementations, system 1100 may generate a 3D scan by scanning an impression made of an ear of a user. For example, during a customized hearing device manufacturing process, an audiologist or the like may insert a shape-forming material (e.g., silicone) into an ear canal of a user. The shape-forming material is configured to retain the shape defining the dimensions of the ear canal when removed from the ear canal. After the impression is removed from the ear canal, system 1100 may use any suitable 3D scanner to 3D scan the impression to generate a 3D scan of the ear canal.

In certain examples, multiple impressions may be made of the ear of the user at different states of the jaw of the user such as those described herein. For example, a first impression of the ear canal may be made while the jaw of the user is in a first state, a second impression of the ear canal may be made while the jaw of the user is in a second state, and a third impression of the ear canal may be made while the jaw of the user is in a third state. System 1100 may scan the first, second, and third impressions in any suitable manner such as described herein to generate multiple different 3D scans of the ear canal. Similar to that described above, system 1100 may compare the 3D scans in any suitable manner to determine suitable positions for one or more compressible regions of a shell of ITE component 106.

In certain alternative examples, the shell of ITE component 106 may be formed so as to fit any one of a plurality of different users as opposed to being custom formed for a particular user.

Based on the dimensions of the ear canal of the user, system 1100 may generate a 3D model of the shell of the ITE component of the hearing device. In generating the 3D model, system 1100 may take into account any suitable information associated with the user and/or the hearing device. For example, system 1100 may use information (e.g., statistical information, ear shape intelligence, etc.) about optimal placement of a compressible region of a shell. Additionally or alternatively, system 1100 may use information regarding placement of components (e.g., a vent, sensor(s), a receiver, a removal filament, cerumen protection, etc.) to be included in the hearing device when determining where to position a compressible region of a shell. Additionally or alternatively, the generating of the 3D model may include adding support structures to one or more cavities to facilitate printing and/or decrease compressibility of a cavity to a desired value. System 1100 may generate the 3D model in any suitable manner using any suitable 3D modeling program.

Based on the 3D model, system 1100 may additively manufacture the shell of ITE component 106. System 1100 may use any suitable additive manufacturing process to form the shell of ITE component 106 such as those described herein. For example, system 1100 may use DLP to form the shell of an ITE component out of silicone.

In certain examples, system 1100 may be configured to facilitate removal of excess (e.g., uncured) material from one or more cavities of a semifinished shell. This may be accomplished in any suitable manner. For example, pressurized air, liquid washes, centrifugation (e.g., in a heated or non-heated centrifuge), and/or evaporation in an oven may be used to remove excess material from one or more cavities of a shell of ITE component 106. In such examples, the additively manufacturing of the shell may include forming inlets/outlets such as those described herein to facilitate removal of the excess material.

In certain examples, system 1100 may perform or otherwise facilitate any suitable post processing operations after additively manufacturing the shell. For example, system 1100 may facilitate closing inlets/outlets of one or more cavities in shells, ultraviolet ("UV") post curing, washing, high temperature curing, and/or any other suitable process.

The finishing of the assembly of hearing device 100 may include, for example, a lacquer process, component insertion (e.g., insertion of housing 314 within elongate receptacle 306), serialization, and/or any other finishing process for hearing device 100.

The preceding disclosure describes various exemplary shells of ITE component 106 that are configured to fit at least partially within an ear canal. However, it is understood that principles such as those described herein may be used to manufacture other components of hearing device 100 and/or any other suitable device. For example, principles such as those described herein may be used to manufacture a housing of a BTE component such that the housing of the BTE component includes a compressible region.

Figure 12:
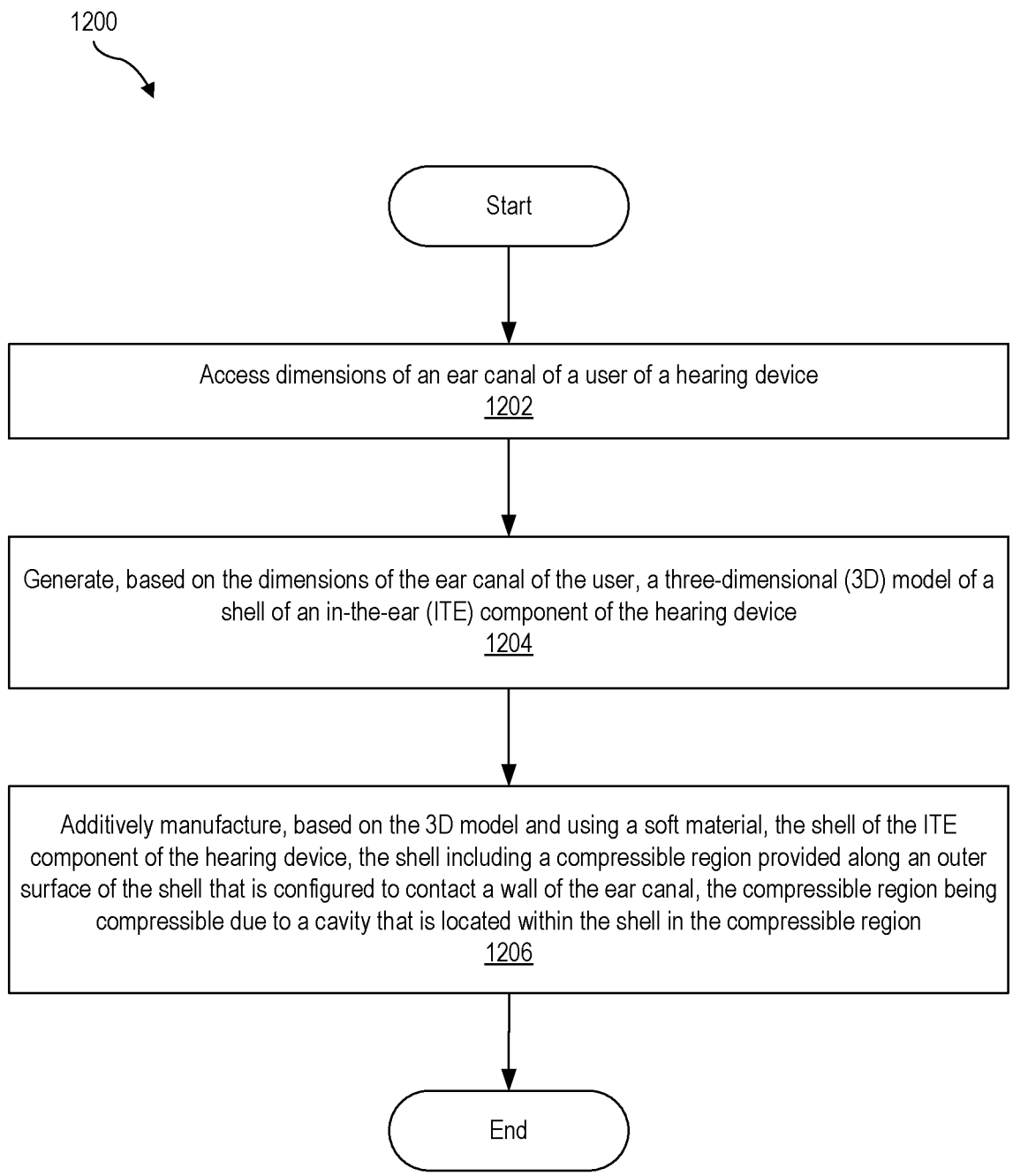
FIG. 12 illustrates an exemplary method according to principles described herein.

FIG. 12 illustrates an exemplary method 1200 for manufacturing a hearing device according to principles described herein. While FIG. 12 illustrates exemplary operations according to one embodiment, other embodiments may omit, add to, reorder, and/or modify any of the operations shown in FIG. 12. One or more of the operations shown in FIG. 12 may be performed by a hearing device manufacturing system such as hearing device manufacturing system 1100, any components included therein, and/or any implementation thereof.

At operation 1202, a hearing device manufacturing system such as hearing device manufacturing system 1100 may access dimensions of an ear canal of a user of a hearing device. Operation 1202 may be performed in any of the ways described herein. For example, a hearing device manufacturing system (e.g., system 1100) may generate or receive 3D scan information of an ear canal of a user.

At operation 1204, the hearing device manufacturing system may generate, based on the dimensions of the ear canal of the user, a 3D model of a shell of an ITE component of the hearing device. Operation 1204 may be performed in any of the ways described herein.

At operation 1206, the hearing device manufacturing system may additively manufacture, based on the 3D model and using a soft material, the shell of the ITE component of the hearing device. For example, the hearing device manufacturing system may instruct a 3D printing device to 3D print the shell based on the 3D model. As described herein, the shell is additively manufactured so as to include a compressible region provided along an outer surface of the shell, the compressible region configured to contact a wall of the ear canal. The compressible region is configured to be compressible due to a cavity that is located within the shell in the compressible region. Operation 1206 may be performed in any of the ways described herein.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g., a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 13:
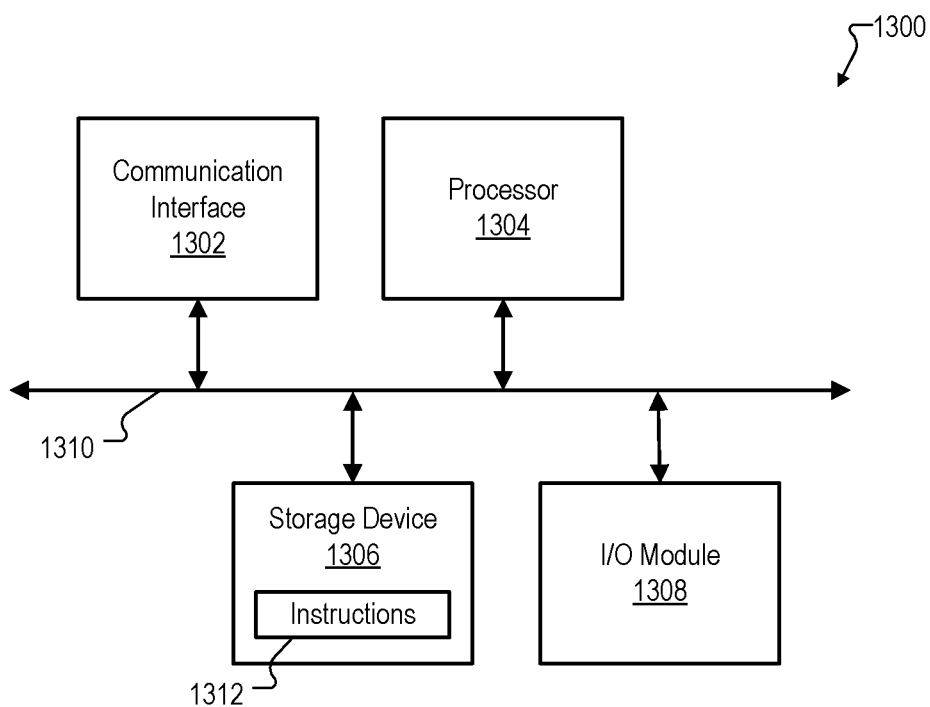
FIG. 13 illustrates an exemplary computing device according to principles described herein.

FIG. 13 illustrates an exemplary computing device 1300 that may be specifically configured to perform one or more of the processes described herein. As shown in FIG. 13, computing device 1300 may include a communication interface 1302, a processor 1304, a storage device 1306, and an input/output ("I/O") module 1308 communicatively connected one to another via a communication infrastructure 1310. While an exemplary computing device 1300 is shown in FIG. 13, the components illustrated in FIG. 13 are not intended to be limiting. Additional or alternative components may be used in other embodiments. Components of computing device 1300 shown in FIG. 13 will now be described in additional detail.

Communication interface 1302 may be configured to communicate with one or more computing devices. Examples of communication interface 1302 include, without limitation, a wired network interface (such as a network interface card), a wireless network interface (such as a wireless network interface card), a modem, an audio/video connection, and any other suitable interface.

Processor 1304 generally represents any type or form of processing unit capable of processing data and/or interpreting, executing, and/or directing execution of one or more of the instructions, processes, and/or operations described herein. Processor 1304 may perform operations by executing computer-executable instructions 1312 (e.g., an application, software, code, and/or other executable data instance) stored in storage device 1306.

Storage device 1306 may include one or more data storage media, devices, or configurations and may employ any type, form, and combination of data storage media and/or device. For example, storage device 1306 may include, but is not limited to, any combination of the non-volatile media and/or volatile media described herein. Electronic data, including data described herein, may be temporarily and/or permanently stored in storage device 1306. For example, data representative of computer-executable instructions 1312 configured to direct processor 1304 to perform any of the operations described herein may be stored within storage device 1306. In some examples, data may be arranged in one or more databases residing within storage device 1306.

I/O module 1308 may include one or more I/O modules configured to receive user input and provide user output. I/O module 1308 may include any hardware, firmware, software, or combination thereof supportive of input and output capabilities. For example, I/O module 1308 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1308 is configured to provide graphical data to a display for presentation to a user. The graphical data may be representative of one or more graphical user interfaces and/or any other graphical content as may serve a particular implementation.

In some examples, any of the systems, hearing devices, and/or other components described herein may be implemented by computing device 1300. For example, memory 102 or memory 1102 may be implemented by storage device 1306, and processor 104 or processor 1104 may be implemented by processor 1304.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A hearing device comprising:
   an in-the-ear (ITE) component comprising a shell that is custom formed of a soft material by additive manufacturing to fit at least partially within an ear canal of a user,
   wherein:
   the shell includes a compressible region provided along an outer surface of the shell that is configured to contact a wall of the ear canal;
   when the shell is viewed in cross section, the compressible region is provided on only one side of a longitudinal axis of the shell; and
   the compressible region is compressible due to a cavity that is located within the shell in the compressible region and that is configured to compress when the ear canal deforms while the ITE component is inserted within the ear canal of the user.

2. The hearing device of claim 1, wherein the compressible region is located on the shell such that, when the ITE component is worn by the user, the compressible region contacts a portion of the ear canal of the user that changes shape with jaw movement of the user.

3. The hearing device of claim 1, wherein the compressible region is further compressible due to an additional cavity that is located within the shell in the compressible region and that is configured to compress when the ear canal deforms while the ITE component is inserted within the ear canal of the user.

4. The hearing device of claim 1, wherein a support structure is provided within the cavity.

5. The hearing device of claim 4, wherein the support structure includes at least one of a lattice support structure or a tree-like support structure.

6. The hearing device of claim 5, wherein:
   the support structure includes the lattice support structure; and
   the lattice support structure is provided on an inner surface of the cavity and only extends partially into the cavity to stiffen the inner surface of the cavity.

7. The hearing device of claim 1, further comprising a housing including one or more components,
   wherein:
   the shell includes an elongate receptacle that extends along a longitudinal length of the shell;
   the cavity is open on one end to the elongate receptacle; and the housing is positioned within the elongate receptacle.

8. The hearing device of claim 7, wherein the cavity is sealed by the housing.

9. The hearing device of claim 7, wherein the cavity is sealed by a sleeve that is provided within the elongate receptacle and that is configured to receive the housing.

10. A semifinished shell for an in-the-ear (ITE) component of a hearing device, the semifinished shell comprising:
a compressible region provided along an outer surface of the semifinished shell that is configured to contact a wall of an ear canal of a user of the hearing device;
a cavity located within the semifinished shell in the compressible region, the cavity configured to compress when the ear canal deforms while the ITE component is inserted within the ear canal of the user;
an inlet connecting the cavity to an exterior of the semifinished shell; and
an outlet connecting the cavity to the exterior of the semifinished shell,
wherein:
when the semifinished shell is viewed in cross section, the compressible region is provided on only one side of a longitudinal axis of the semifinished shell; and
the semifinished shell is custom formed of a soft material by additive manufacturing to fit at least partially within the ear canal of the user.

11. The semifinished shell of claim 10, wherein the compressible region is located on the semifinished shell such that, when the ITE component is worn by the user, the compressible region contacts a portion of the ear canal of the user that changes shape with jaw movement of the user.

12. The semifinished shell of claim 10, wherein:
the compressible region is further compressible due to an additional cavity that is located within the semifinished shell in the compressible region and that is configured to compress when the ear canal deforms while the ITE component is inserted within the ear canal of the user; and
the semifinished shell further comprises:
an additional inlet connecting the additional cavity to the exterior of the semifinished shell; and
an additional outlet connecting the additional cavity to the exterior of the semifinished shell.

13. The semifinished shell of claim 10, further comprising an elongate receptacle that extends along a longitudinal length of the semifinished shell,
wherein the inlet connects to the elongate receptacle.

14. The semifinished shell of claim 10, wherein a support structure is provided within the cavity.

15. The semifinished shell of claim 14, wherein the support structure includes at least one of a lattice support structure or a tree-like support structure.

16. The semifinished shell of claim 15, wherein:
the support structure includes the lattice support structure; and
the lattice support structure is provided on an inner surface of the cavity and only extends partially into the cavity to stiffen the inner surface of the cavity.

17. A method comprising:
accessing dimensions of an ear canal of a user of a hearing device;
generating, based on the dimensions of the ear canal of the user, a three-dimensional (3D) model of a shell of an in-the-ear (ITE) component of the hearing device that is configured to fit at least partially within the ear canal of the user; and
additively manufacturing, based on the 3D model and using a soft material, the shell of the ITE component of the hearing device,
wherein:
the shell includes a compressible region provided along an outer surface of the shell that is configured to contact a wall of the ear canal;
when the shell is viewed in cross section, the compressible region is provided on only one side of a longitudinal axis of the shell; and
the compressible region is compressible due to a cavity that is located within the shell in the compressible region and that is configured to compress when the ear canal deforms while the ITE component is inserted within the ear canal of the user.

18. The method of claim 17, wherein the additively manufacturing of the shell comprises:
forming an inlet connecting the cavity to an exterior of the shell;
forming outlet connecting the cavity to the exterior of the shell;
removing excess material from the cavity by way of the outlet; and
sealing the inlet and the outlet.

19. The method of claim 18, wherein the removing of the excess material from the cavity includes injecting pressurized air into the inlet to expel the excess material out of the cavity through the outlet.

20. The method of claim 18, wherein:
the additively manufacturing of the shell includes forming a support structure on an inner surface of the cavity; and
the support structure extends only partially into the cavity to stiffen the inner surface of the cavity.

21. A shell for an in-the-ear (ITE) component of a hearing device, the shell comprising:
a compressible region provided along an outer surface of the shell that is configured to contact a wall of an ear canal of a user of the hearing device; and
a cavity located within the shell in the compressible region, the cavity configured to compress when the ear canal deforms while the ITE component is inserted within the ear canal of the user,
wherein:
when the shell is viewed in cross section, the compressible region is provided on only one side of a longitudinal axis of the shell; and
the shell is custom formed of a soft material by additive manufacturing to fit at least partially within the ear canal of the user.

* * * * *